United States Patent [19]

Sakuma et al.

[11] Patent Number: 5,148,542
[45] Date of Patent: Sep. 15, 1992

[54] MULTITASK PROCESSING APPARATUS UTILIZING A CENTRAL PROCESSING UNIT EQUIPPED WITH A MICRO-PROGRAM MEMORY WHICH CONTAINS NO SOFTWARE INSTRUCTIONS

[75] Inventors: Hajime Sakuma; Hiroko Shinohara, both of Tokyo, Japan

[73] Assignee: NEC Corporation, Tokyo, Japan

[21] Appl. No.: 517,402

[22] Filed: May 1, 1990

Related U.S. Application Data

[63] Continuation of Ser. No. 377,801, Jul. 10, 1989, abandoned, which is a continuation of Ser. No. 90,278, Aug. 28, 1987, abandoned.

[30] Foreign Application Priority Data

Aug. 28, 1986 [JP] Japan .............................. 61-203007
Apr. 15, 1987 [JP] Japan ................................ 62-93663

[51] Int. Cl.⁵ ........................... G06F 9/22; G06F 9/30
[52] U.S. Cl. ..................................... 395/700; 395/800
[58] Field of Search ... 364/200 MS File, 900 MS File, 364/300

[56] References Cited

U.S. PATENT DOCUMENTS

| | | | |
|---|---|---|---|
| 3,858,182 | 12/1974 | Delagi et al. | 364/200 |
| 4,084,224 | 4/1978 | Appell et al. | 364/200 |
| 4,084,228 | 4/1978 | Dufond et al. | 364/200 |
| 4,152,761 | 5/1979 | Louie | 364/200 |
| 4,177,513 | 12/1979 | Hoffman et al. | 364/200 |
| 4,183,083 | 1/1980 | Chatfield | 364/200 |
| 4,286,322 | 8/1981 | Hoffman et al. | 364/200 |
| 4,297,743 | 10/1981 | Appell et al. | 364/200 |
| 4,475,156 | 10/1984 | Federico et al. | 364/300 |
| 4,550,369 | 10/1985 | Rokutanda et al. | 364/200 |
| 4,658,351 | 4/1987 | Teng | 364/200 |
| 4,688,167 | 8/1987 | Agarwal | 364/200 |

*Primary Examiner*—Thomas C. Lee
*Assistant Examiner*—Robert B. Harrell
*Attorney, Agent, or Firm*—Foley & Lardner

[57] ABSTRACT

An apparatus for processing a plurality of tasks comprises a central processing unit (CPU) equipped with a microprogram memory, and a memory. A processing demand to the real time OS required for the execution of the multitask processing is treated as exclusive instruction. For this purpose, the system includes a decoder for decoding the exclusive instruction, and the CPU or the memory has a microprogram for the realization of the instruction.

7 Claims, 12 Drawing Sheets

MULTITASK PROCESSING APPARATUS UTILIZING A CENTRAL PROCESSING UNIT EQUIPPED WITH A MICRO-PROGRAM MEMORY WHICH CONTAINS NO SOFTWARE INSTRUCTIONS

This application is a continuation of application Ser. No. 07/377,801, filed Jul. 10, 1989, which is now abandoned and a continuation of application Ser. No. 07/090,278 filed Aug. 28, 1987, now abandoned.

BACKGROUND OF THE INVENTION

1. Field of the Invention

The present invention relates to the multitask processing apparatus which divides an application program into plural task and executes a parallel processing of plural tasks as whole in order to realize a function of the application effectively.

2. Description of Related Art

Hitherto, the real time operating system has become indispensable as management software in order to execute plural tasks in parallel. The operating system will be abbreviated as "OS" hereinafter in the specification. In general, the real time OS possesses a number of functions such a task management function for starting a task and completing the processing, a function of synchronous communication between tasks which controls the waiting period between tasks and the transmission-reception of data, a function relating to the interrupt, other memory areas management function and a time management function.

When an application program makes use of the real time OS, the program demands a processing of each function with respect to the real time OS. The demand of the processing is called a "system call", and the operation of generating the demand of the processing is called a "generation of the system call". An example of the generation of the system call will be explained.

A system call processing can be generally divided into three parts, that is, task save processing, internal processing and dispatch processing as illustrated in FIG. 1. In the part of the task save processing 100, the real time OS utilizes sorts of registers for the system call processing so that the execution environment of the task such as informations of the registers when the task generates a system call (called "context" hereinafter) is saved to an area inherent to the task, that is, task control block (called "TCB" hereinafter). In the part of the internal processing 101, the processing for the realization of the functions which are objects of the system call is executed. In the part of the dispatch processing 102, the processing is executed in the form that the task with the highest priority order to be next executed is selected from the tasks in an executable state, and the context saved in TCB of the selected task is returned to the registers in order to shift the control from the real time OS to the task. FIG. 1 shows a processing of a system call which demands the suspension of the designated task in the conventional multitask processing. The tasks transits four states, that is, a dormant state, an executable state, an execution state and a waiting state. It is assumed that the priority order of the task 1 is prior to that of the task 2. The execution task 1 designates the task 2 in the executable state and generates a system call demanding the suspension. The real time OS obtains the right of use of the central processing unit (called "CPU" hereinafter) of the computer by the generation of a system call of the task 1 so that the context of the system call generating task 1 is saved to TCB 1 which the task 1 possesses. Subsequently, the area representing the state of the task held in TCB 2 of the task 2 (called "task status" hereinafter) is set to the reopen demand waiting state in order to suspend until the issue of the reopen demand, and the task 2 is eliminated from the registration of the area which manages executable tasks (called "ready queue" hereinafter). In the dispatch processing, the real time OS selects the task 1 as the task to be next executed, based on the ready queue, and the context of the task 1 saved in TCB 1 of the task 1 is returned on the CPU. The right of use of the CPU is shifted to the task 1. Thus, the processing of the system call is finished.

In the conventional multitask processing apparatus as mentioned above, the tasks of the application program and the real time OS of the management software utilize equally the CPU resource. Therefore, at the execution of the real time OS, the context of the execution task must be saved, which will increase the execution time of the real time OS, that is, the overhead so that the performance of the whole system is lowered. The high speed processing of the real time OS is required for the improvement of the real time characteristic of the system.

FIG. 2 shows an example of the transmission-reception of data between two tasks. For the transmission-reception of data between tasks, a common buffer, called mailbox, is generally used. A task A, in steps 200-300 generates a transmission data and transmits a pointer to the data as parameter to the mailbox number 1 (#MBO-1) by a system call SEND-DATA. Here, it is assumed that the parameter of the system call SEND-DATA is a register RO.

A task B, in steps receives the data transmitted from the task A through the mailbox number 1 and executes the following processing based on the received data by means of a system call RECEIVE-DATA. It is assumed that a pointer to the received data is stored in the register RO. In the case that the transmission data does not exist at the generation of the system call, a task B becomes a waiting state with respect to the mailbox number 1 and the processing is temporarily reserved, so that the control is shifted to the other task.

FIG. 3 shows the processing steps 301-317 of each system call. The conventional real time OS is realized by combination of instructions as system software. Therefore, it is necessary to save the environment or context which is necessary to the execution of a program such as a register and a program status word (called "PSW" hereinafter) of the task which generates a system call at the head of the processing before the execution of each system call. The areas for the save of the context which are called a task control block or TCB are generally reserved on the memory for all tasks respectively, so that, at the generation of a system call, the context of the task is saved in the TCB corresponding to the task which generates the system call.

After the processing of the system call, the task with the highest priority order is selected and the control is shifted to the task. This is called "dispatching" as mentioned hereinbefore.

Concretely, by the system call RECEIVE-DATA, the context of the task which generates a system call is saved to TCB at the start. Then, the state of the mailbox is judged by the mailbox number represented by a parameter. When the data has been transmitted, a pointer to the data is stored in the area corresponding to the register RO in the TCB of the task which generates the system call and the dispatching is executed. In the case that the data is not transmitted, the task which generates the system call waits for a mailbox and the task status of the generating task becomes a waiting state. The task status is generally assured in the TCB of each task as well as the context of the task.

Then, an identifier of the task with respect to the mailbox is added in order to show that the generating task becomes a waiting state with respect to the mailbox represented by a parameter. Thereafter, the real time OS manages a structure or ready queue for the processing of all executable tasks in a bundle which is generally assured on the memory. The task which has become a waiting state is not an executable state so that the task is eliminated from the registration of the ready queue. After the elimination, the similar dispatching processing is executed.

Subsequently, in the case of the processing of a system call SEND-DATA, as well as that of other system calls, the context of the task which generates the system call is saved to the TCB. The state of the mailbox indicated by the parameter is judged. When there is no waiting task, a pointer to the data area indicated by the register RO is stored in the mailbox and the dispatching processing is executed.

In the case that a waiting task exists with respect to the mailbox, the task status of the waiting task is set as executable and the identifier of the task is eliminated from the mailbox and registered in the ready queue. Then, a pointer of the transmitted data is stored in the register RO of the task and the dispatching processing is executed.

FIG. 4 shows a flowchart of the execution of the task A and B by steps 400 and 401 illustrated in FIG. 2 by executing the above mentioned processing.

It is assumed that the priority order is set in the tasks respectively and that the task B is prior to the task A. First, the task B is activated in the execution condition and generates a demand for the reception of the data from mailbox #MBO-1 by the system call RECEIVE-DATA. At this time, the data is not transmitted to the mailbox so that the generating task transits a waiting state and the control is shifted to the task A. After generating data, the task A transmits the data to the mailbox #MBO-1 by the system call SEND-DATA. In the mailbox #MBO-1, the task B has already become a waiting state so that the transmission data is sent to the task B. Thus, the task B is dissolved from the waiting state and changes to the executable state. In the case of the dispatching processing, the task B is selected and the control is shifted to it because the priority order of the task B is prior to that of the task A.

As mentioned above, the conventional real time OS which is principal software for realizing the multitask processing is realized by the combination of instructions so that the processing is sensibly complicated. The number of steps required for the processing depends on the scale of the OS. However, several ten to several hundred steps are generally required for the processing of each system call.

Further, the save of the context after the first and last processing of the OS and the return processing become necessary in order to prevent the destruction of the context of tasks because the processing of each task and that of the OS utilizes common registers and other hardware resources. It is general that several ten to several hundred steps are required for the save, the return processing and the dispatching processing.

The real time OS must respond to a number of events in a real time as its name represents. In the present condition, however, it is impossible to obtain the performance which can satisfy enough demands of the application program because the processing is complicated. In the case of evaluation of the performance of the real time OS, the overhead of the system call often becomes a problem. The overhead is a time from the generation of the system call to the return of the control in the task. In the above mentioned example, assuming that the number of steps required for the generation of system calls, the execution of each system call after the save of the context and the return processing and the dispatching processing is 200, the mean number of clocks of the execution of an instruction is 10 clocks, and if the action frequency is 5 MHz, the mean overhead becomes 400 microseconds.

This time is not negligible in the application field which needs particularly the real time characteristic. Accordingly it is a problem to reduce the overhead for the planning of the real time OS.

Further, in the application system which utilizes the real time OS, it often happens that the flow of the processing is changed at the opportunity of several interrupts, so that it is necessary to improve the response characteristic to the interrupt. On the contrary, the OS which controls the multitask processing operates a common data structure which manages the state of tasks respectively and tasks in executable state according to the priority order. Accordingly, there are many parts which must be guarded from the interrupts which are asynchronously generated from the external in order to prevent the competition of accesses.

The example of the error operation in the case that there is no guard against interrupts will be concretely explained. It is assumed that an interrupt is generated at the level of INT by the system call RECEIVE-DATA shown in FIG. 3. FIG. 5 represents the interrupt processing routine started by the interrupt INT. The interrupt processing routine is generally operated in the state where the interrupt cannot be executed, so that it generates a system call of demanding the dispatching 501 after the simple processing 500.

Now, when the interrupt is generated at the level INT during the processing of the system call RECEIVE-DATA, the system call generating task is in the process for changing to the waiting state, the task status becomes a waiting state and the identifier of the task is registered with respect to the mailbox. The interrupt processing routine to which the control is shifted generates a dispatching processing demand after the simple processing. In the dispatching processing of the OS, ready queues are judged and the task at the highest priority order is selected. Then, the task which generates the interrupted system call RECEIVE-DATA is not eliminated from the registration of the ready queue. Accordingly, the generating task is selected again by the dispatching processing and returns to an execution state. The task which reopens the execution judges that the data has been received by the generation of the system call RECEIVE-DATA and continues to execute the processing. However, the pointer to the received data becomes an incertain value so that the following operation is not assured.

Accordingly, it is necessary to guard against the interrupt in the major part of the processing in case of the system call as mentioned in the present invention.

The more the guard parts exist, the more the stability of the whole system is improved. On the contrary, the interrupt response characteristic is lowered which is a problem, too, in the planning of the real time OS.

SUMMARY OF THE INVENTION

Accordingly, it is an object of the present invention to provide a multitask processing apparatus which has overcome at least one of the above mentioned defects of the conventional apparatus.

Another object of the present invention is to provide a multitask processing apparatus which can minimize the processing of the save and return of the context of a task so that it can operate at a high speed.

Still another object of the present invention is to provide a multitask processing apparatus which can greatly decrease the overhead of the real time operating system so as to effectively execute application programs in a multitask form.

A further object of the present invention is to provide a multitask processing apparatus adapted to carry out various functions necessary for multitask processing at a high speed by means of microprograms in the form of a system call instruction.

A still further object of the present invention is to provide a multitask processing apparatus which can treat an interrupt request in the course of processing a system call for the real time operating system without inhibiting the interrupt.

The above and other objects of the present invention are achieved in accordance with one aspect of the present invention by a multitask processing apparatus which includes a computer comprising a central processing unit equipped with a microprogram memory and a memory, characterized in that a processing demand to the real time OS required for the execution of the multitask processing is treated as an exclusive instruction, that it comprises means for the decode of the exclusive instruction, hardware resources for the realization of said instruction and a microprogram for the realization of said instruction. Furthermore, it comprises means for that the processing demand to the real time OS is decoded as exclusive instruction by the means for decode, and realized by the hardware resources according to the microprogram stored in the microprogram memory.

In accordance with another aspect of the present invention there is provided a multitask processing apparatus which includes a computer comprising a central processing unit equipped with a microprogram memory and a memory, characterized in that a processing demand to the real time OS required for the execution of the multitask processing is treated as an exclusive instruction, that it comprises a unit for the decode of the exclusive instruction, hardware resources for the realization of said instruction and a microprogram for the realization of said instruction, and that it comprises a further unit for that the processing demand to the real time OS is decoded as an exclusive instruction by the means for decode, and realized by the hardware resources according to the microprogram stored in the microprogram memory.

The above and other objects, features and advantages of the present invention will be apparent from the following description of preferred embodiments of the invention with reference to the accompanying drawings.

DESCRIPTION OF THE PREFERRED EMBODIMENTS

Figure 6:
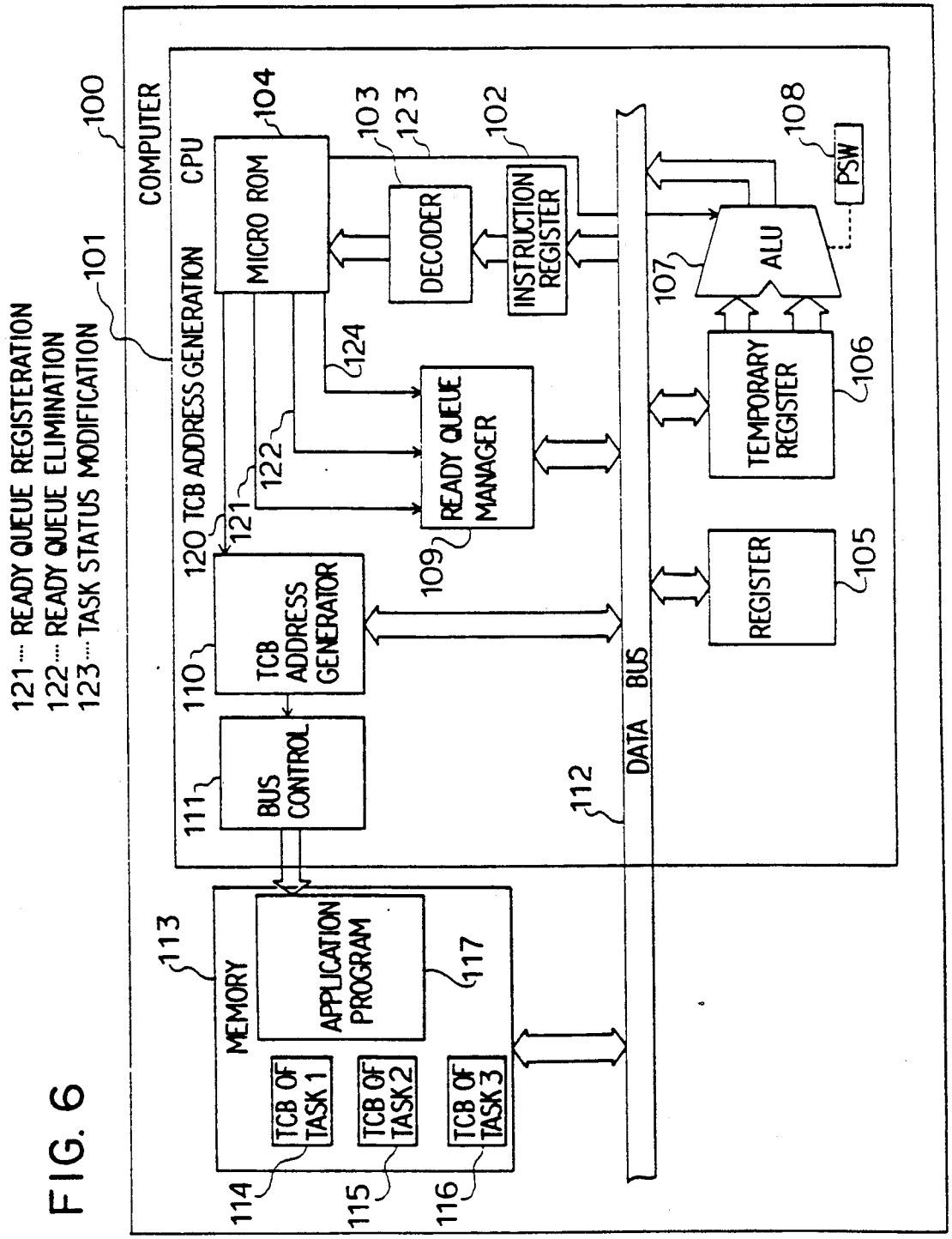
FIG. 6 illustrates the whole constitution of a first embodiment of the multitask processing apparatus according to the present invention.

Referring to FIG. 6, there is shown in a block diagram the overall construction of a first embodiment of the multitask processing apparatus in accordance with the present invention. In this embodiment, the start of the task and the suspension and reopen of the task of the task management function will be described.

In the shown embodiment, a computer 100 includes a central processing unit 101 (called "CPU" hereinafter) executing the operation and processing of data, and a part of memory 113 which stores the application program and possesses an area for the control of the real time OS. The CPU 101 comprises an instruction register 102 (called "IR" hereinafter), a decoder 103 which decodes the content of the IR 102 and generates an address of the microprogram memory; a micro ROM 104 which stores the microprogram of each instruction, a register 105, a temporary register 106 used for the execution of the instruction, an arithmetic and logic unit 107 (called "ALU" hereinafter), a program status word 108 (called "PSW" hereinafter), a ready queue managing part 109 which manages the tasks in an executable state and executes the registration and elimination of the executable state of tasks according to the signal by the microprogram, a TCB address generator 110 which generates an address of the TCB which the task possesses, based on the information of the designated task as operand of the system call instruction and a bus controlling part 111 which sends an address to an address bus according to the signal from the TCB address generator 110. The part of memory 113 comprises an application program 117 divided into plural tasks, a TCB 114 of the task 1 which is a control block of the task required for the multitask processing, a TCB 115 of the task 2, and a TCB 116 of the task 3.

In the present embodiment, a task transits between four states, that is, a dormant state, an executable state, an execution state and a waiting state. The parallel processing of three tasks, tasks 1, 2 and 3 is executed. The task 1 possesses the highest priority order. The priority order of the task 2 is prior to that of the task 3. A system call instruction provides operand informations such as task numbers which are necessary to the realization of the functions. As a task number, the identification number task ID which is previously assigned to each task is utilized.

First, the operation when the task 1 of the highest priority order starts the task 2 as an execution task will be explained.

Figure 7:
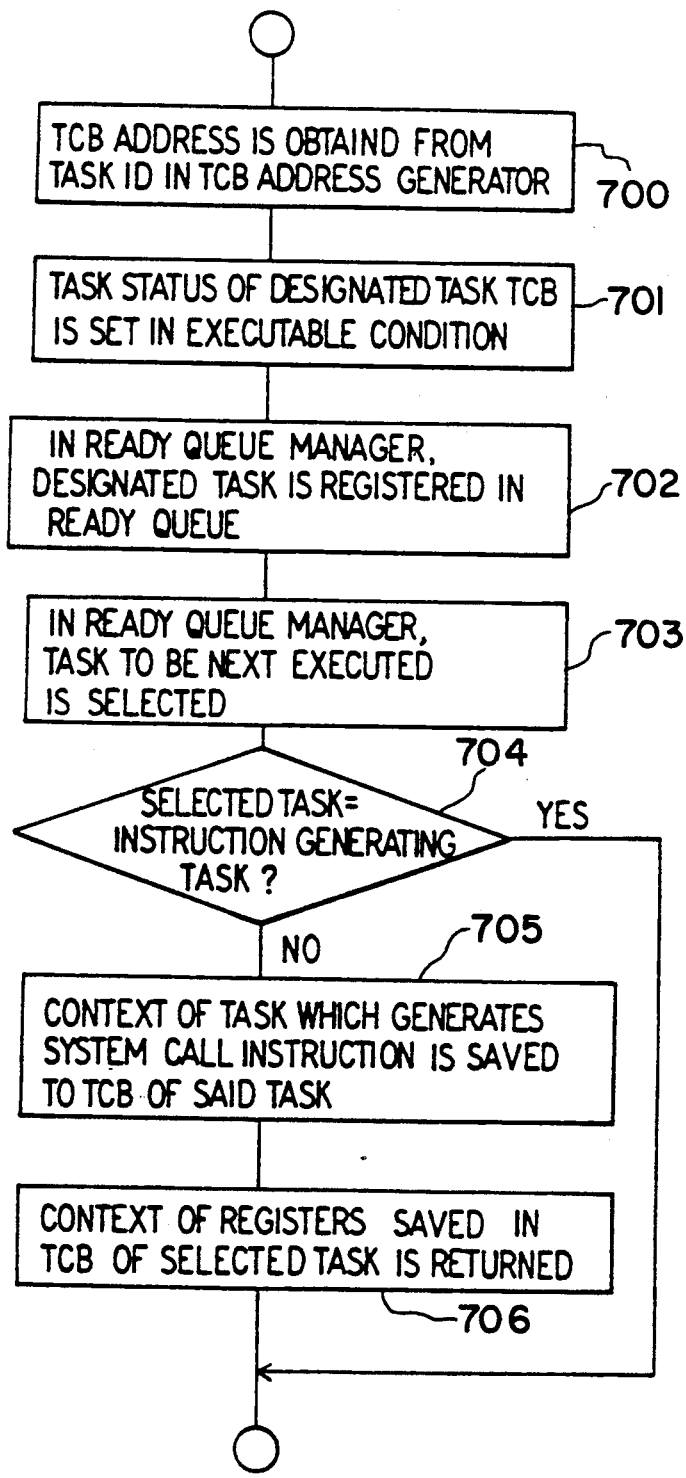
FIG. 7 is a flowchart of the processing of the system call instruction START in the first embodiment.

The task 1, which is the execution, task executes a system call instruction START which starts the task possessing the ID designated by operand in order to start the task 2 in a dormant state. The instruction code indicating the op - code of the START instruction and the instruction code representing the ID number of the task 2 which is an operand is stored in the IR 102, the decoder 103 analyzes in the IR 102, the decoder 103 analyzes the instruction code, and the address of the corresponding microprogram is inputted to the micro ROM 104. The processing of the START instruction is executed according to a signal generated from the micro ROM 104, by means of the temporary register 106, the ALU 107, the TCB address generator 110 and the ready queue managing part 109 in the flow of steps 700-706 illustrated in FIG. 7. The signal for obtaining the TCB address of the task 2 from the ID of the task 2, which is the operand is sent to the TCB address generation signal set line 120. The TCB address generator 110 generates the address of the TCB 2 of the task 2 on the part of memory 113 and transmits it to the bus controller 111. The task status information representing the state of the task in the TCB 2 is taken from the data bus 112, set by the task status modification signal 123 in order to represent the executable state from the dormant state and rewritten in the TCB 2. Then, the ready queue registration signal 121 of the task 2 is generated and the task 2 is registered as an executable task in the ready queue managing part 109 where the real time OS manages the executable tasks. Thereafter, according to the execution task select signal 124, the ready queue managing part 109 selects the task ID to be next executed. When the selected task is different from the system call generating task, the save and return of the context of the task are executed. However, in this case, the priority order of the task 1 is prior to that of the task 2 so that the task 1 (that is, the system call instruction execution task) is selected. Therefore, the return and save of the context of the task are not necessary and the system call processing is rapidly finished. The execution is shifted to the next of the system call instruction START of the task 1.

The operation of the suspension of the task 1 in the case that the task 1 is in an execution state and the task 2 is in executable state will be explained.

Figure 1:
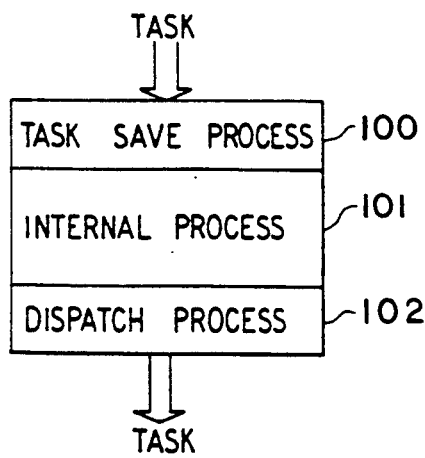
FIG. 1 represents the conventional processing of the system call.
Figure 2:
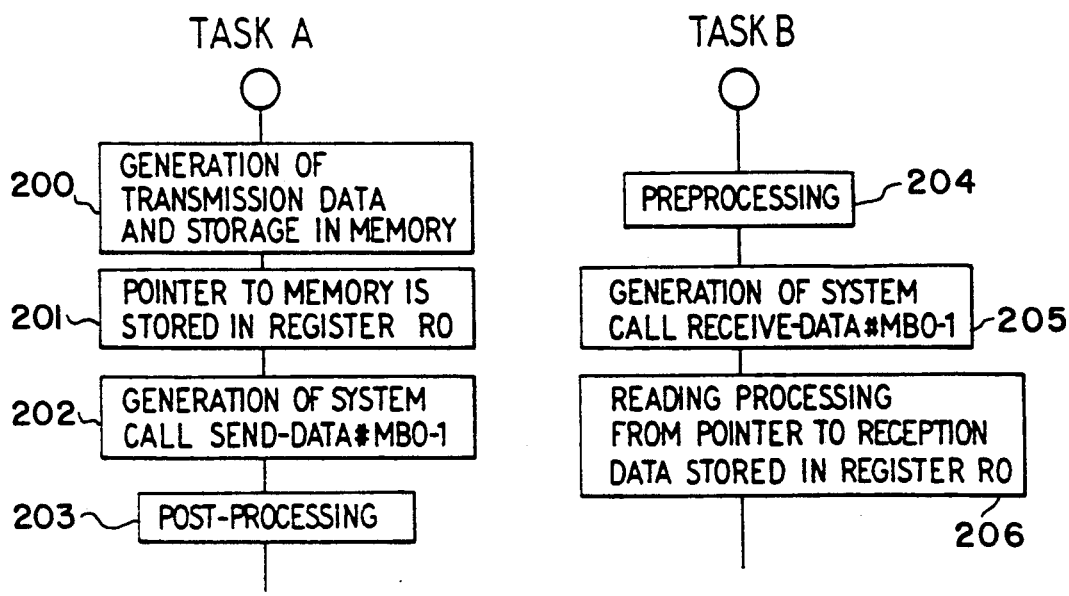
FIG. 2 is a flow chart of the generation of the system call which relates to a data transmission-reception in the multitask processing.
Figure 3:
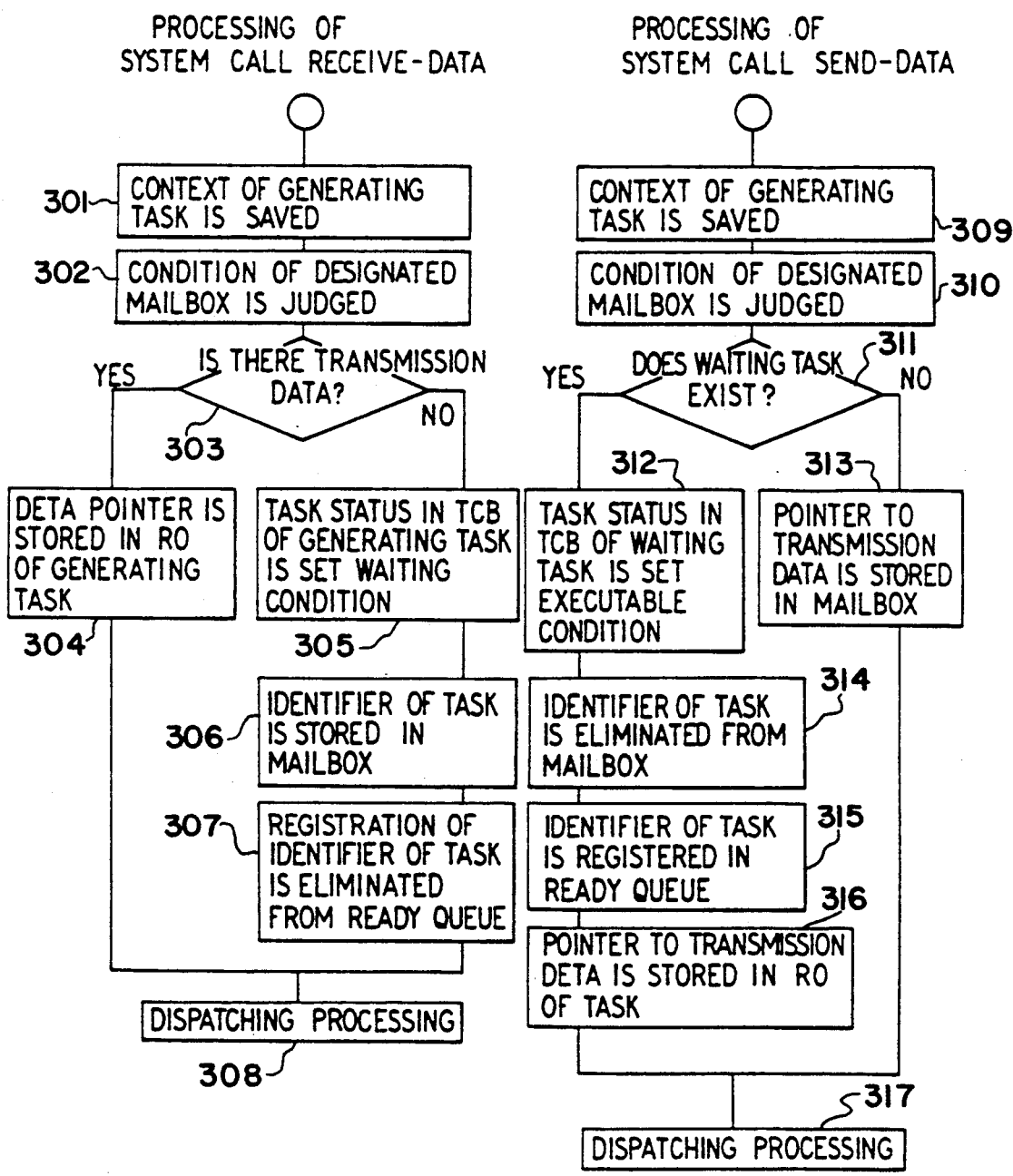
FIG. 3 is a flowchart of the combination of the instructions of the data transmission-reception system call.
Figure 4:
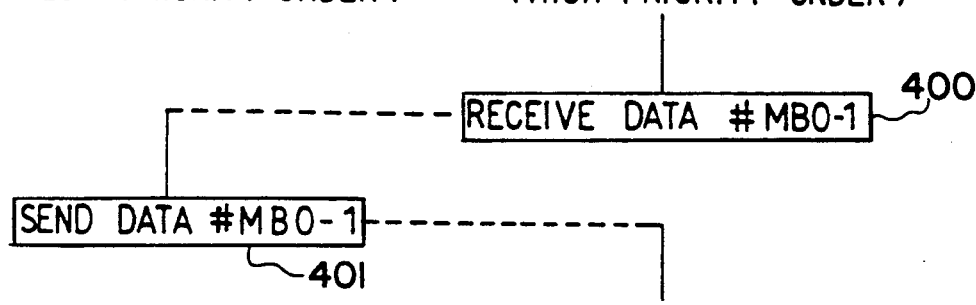
FIG. 4 is a flowchart of the processing of each task in the multitask processing.
Figure 5:
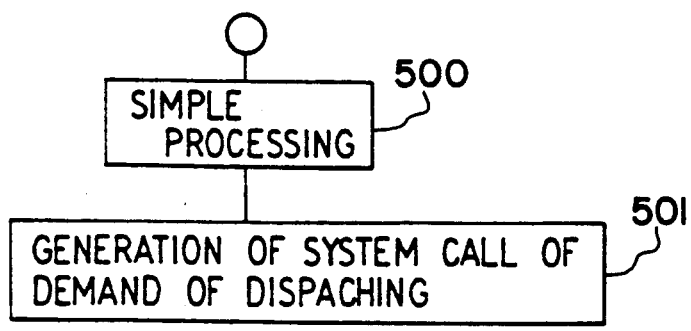
FIG. 5 is a flowchart of the interrupt processing routine.
Figure 8:
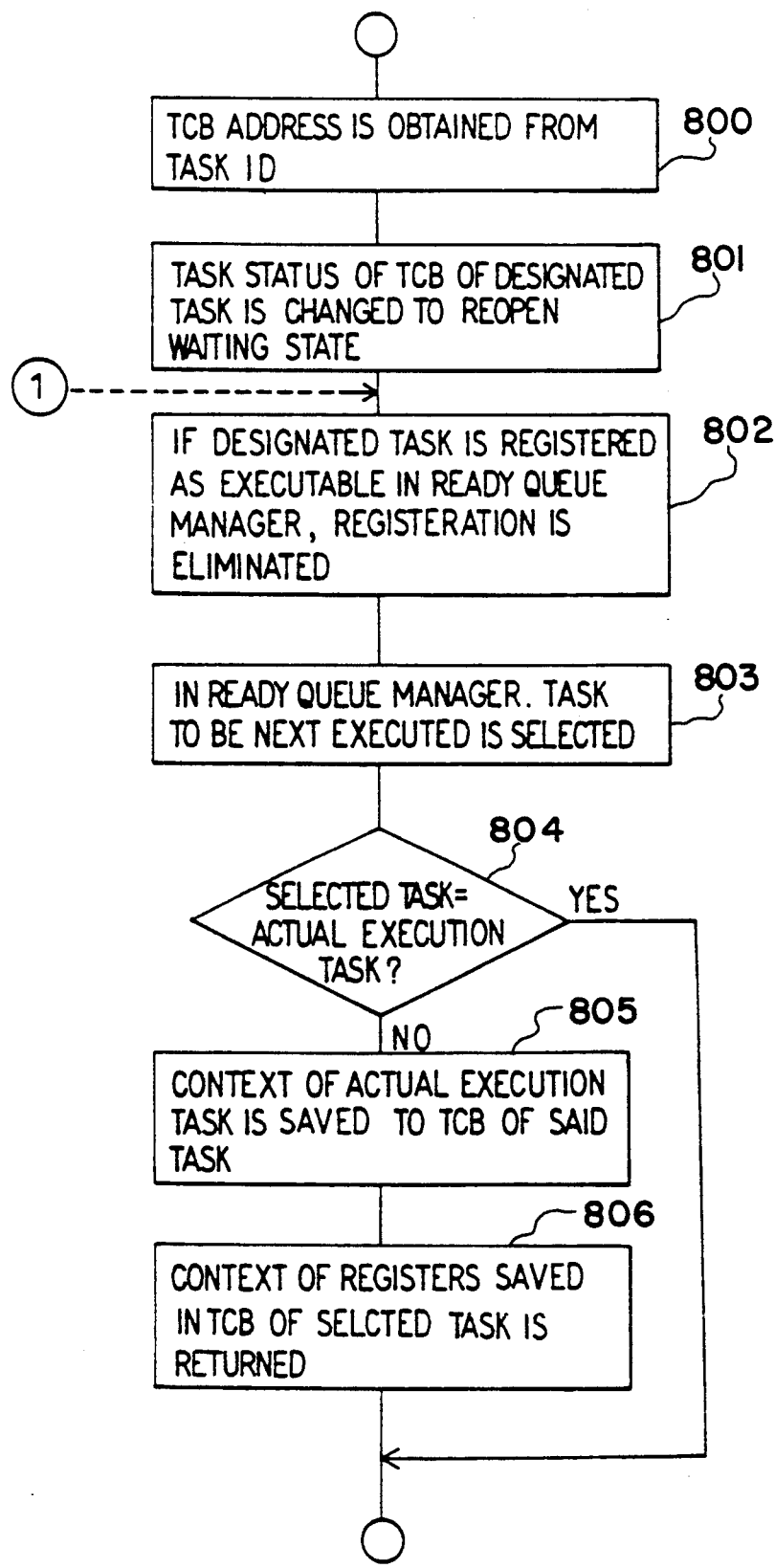
FIG. 8 is a flowchart of the processing of the system call instruction SUSPEND in the embodiment 1.

The execution task 1 indicates the ID of the same task as operand in order to suspend the task when the task 1 is synchronous with the task 2, and executes the system call instruction SUSPEND which suspends the task and changes it to the reopen waiting state. According to the microprogram stored in the micro ROM 104, the SUSPEND instruction realizes the processing as illustrated in the flowchart of steps 800-806 of FIG. 8, by means of the TCB address generator 110 and the ready queue managing part 109 as well as the above mentioned START instruction. In other words, the TCB address of the task 1 is obtained from the ID of the task 1 which is an operand and the task status in the TCB 1 is read and set so that the task status shows the reopen demand waiting state. The task status is rewritten. Then, the ready queue elimination signal 122 is generated and the registration of the task 1 as an executable task is eliminated in the ready queue managing part. According to the execution task select signal 124, the ID of the task 2 is selected as a task to be next executed in the ready queue managing part 109. The task 2 is different from the system call instruction execution task (task 1) so that the context of the task 1 is saved to the TCB 1 of the task 1 and the context of the task 2 is returned from the TCB 2. Accordingly, the held context of the task 2 is returned and the execution is reopened after the system call processing. When an interrupt is generated at the level of 1 in FIG. 3 during the system call instruction processing, the error operation of the system has occurred if the interrupt is inhibited in the CPU. However, in the present embodiment, the system call processing is executed by an instruction, which permits to prevent the generation of the error operation. In addition, the interrupt demand is reserved at this point and executed after the processing of the instruction. Therefore, it is not necessary to worry about the overflow of interrupts by the execution of the real time OS.

Figure 9:
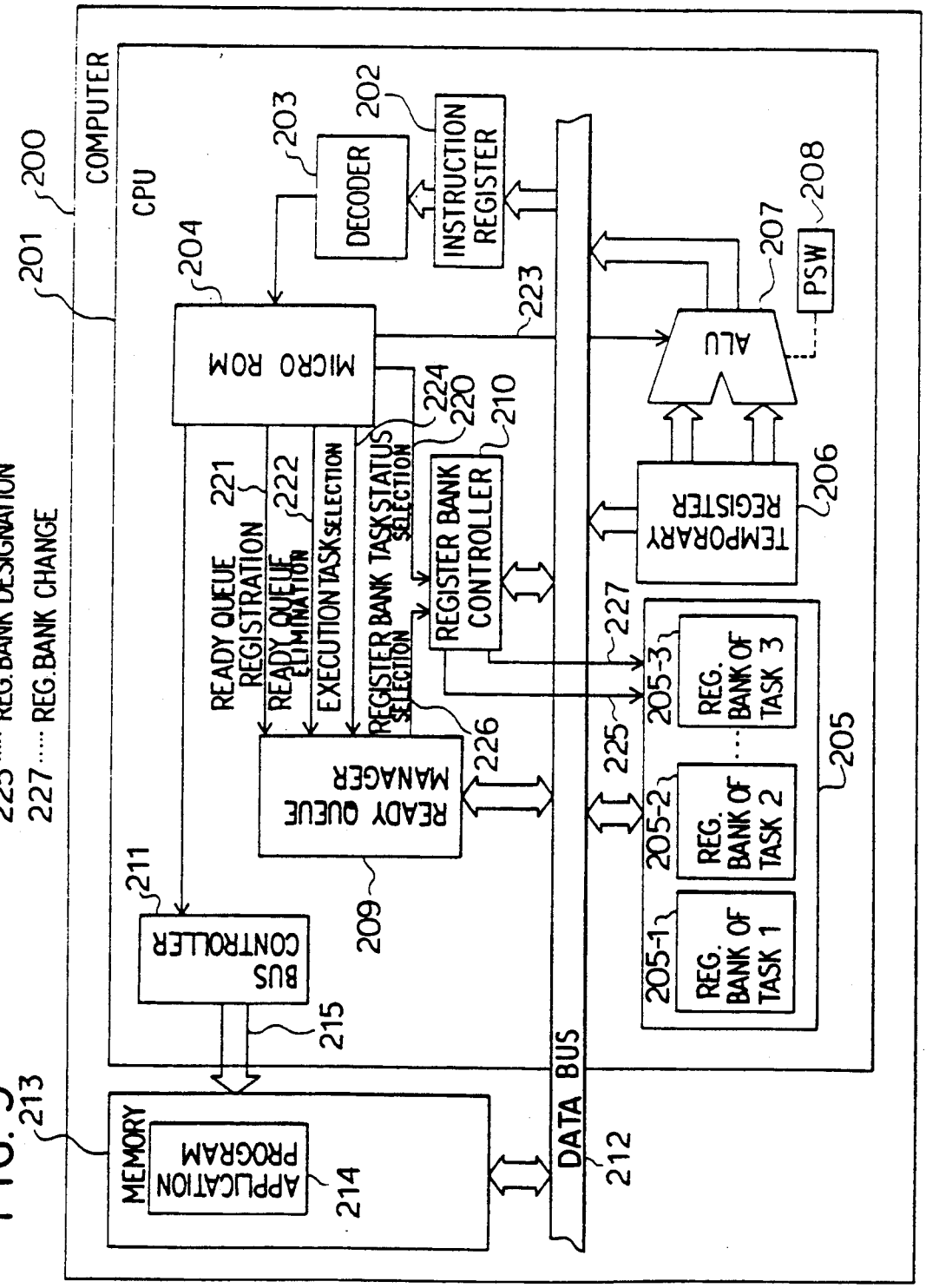
FIG. 9 shows the whole constitution of a second embodiment of the multitask processing apparatus.

FIG. 9 shows the whole constitution of a second embodiment. A computer 200 includes a CPU 201 which executes the operation and processing of data and a part of memory 213 which stores an application program. The CPU 201 comprises a IR 202, a decoder 203 which decodes the content of the IR 202 and generates an address of the microprogram memory, a micro ROM 204 which stores the microprogram of each instruction, a group of register banks 205 consisting of register banks 205-1 to 205-3 containing registers corresponding to the task respectively and task status storing areas, a temporary register 206 used for the execution of the instruction, an ALU 207, a PSW 208, a ready queue managing part 209 which manages the tasks in the executable state and executes the registration and elimination of the tasks in executable state according to a signal by the microprogram, a register bank controller 210 which generates an indication signal of the register bank occupied by the task, based on the informations of the task designated as an operand of the system call and the informations of the task selected as an execution task by the ready queue managing part 209 and a bus controller 211 which sends an address to the address bus according to a signal from the micro ROM 204. In the part of memory 213, the application program 214 divided into plural tasks is disposed.

In the present embodiment, a task transits between four states, that is, dormant state, executable state, execution state, waiting state and the processing of the tasks 1, 2 and 3 is executed in parallel, too. The task 1 possesses the highest priority order. The priority order of the task 2 is prior to that of the task 3. The system call instruction provides the informations required for the realization of the functions such as the task ID number in the form of an operand.

The operation in the case that the task 2 starts the highest priority ordered task 1.

Figure 10:
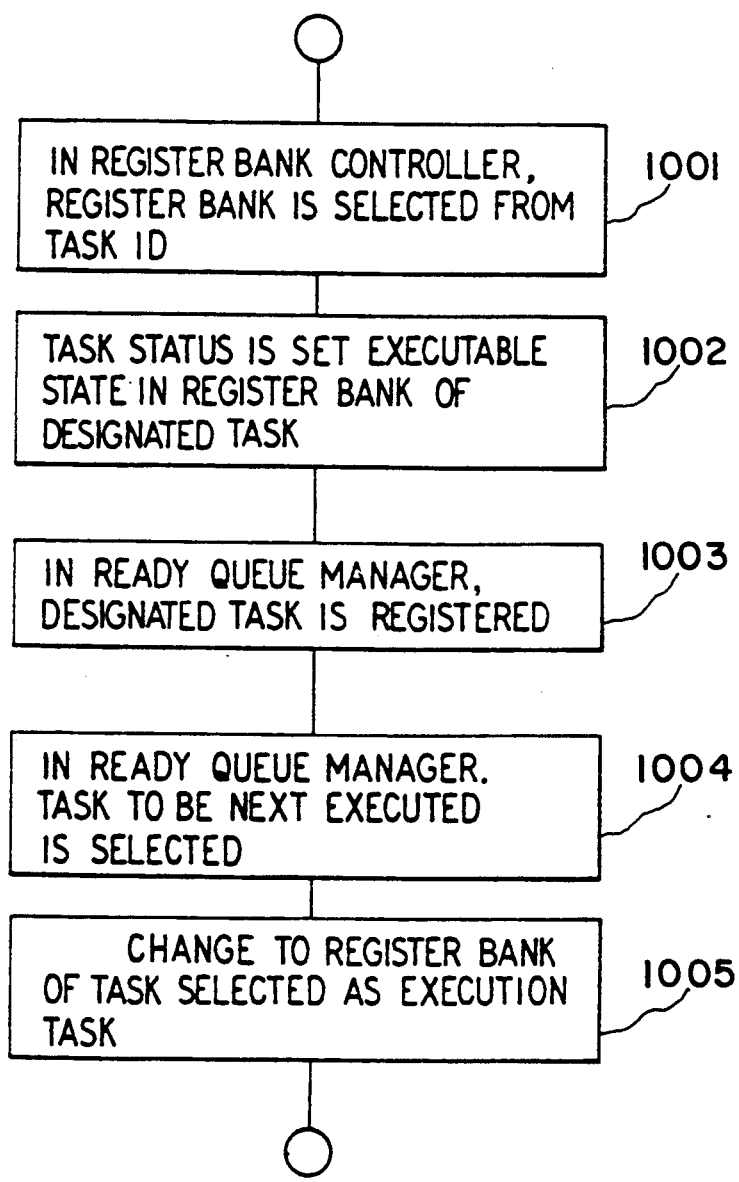
FIG. 10 is a flowchart of the processing of the system call instruction START in second the embodiment.

The task 2 which is an execution task executes the system call instruction START which starts a task possessing the ID designated by an operand in order to start the task 1 in dormant state. The op 11—11 code of the START instruction and the instruction code representing the ID number of the task 1 which is an operand are stored in the IR 202. The decoder 203 analyzes the instruction code and sends an address of the corresponding microprogram to the micro ROM 204. The processing of the START instruction is executed according to the signal generated by the micro ROM 204 by means of the temporary register 206, the ALU 207, the register bank controller 210, and the ready queue managing part 209 in the flow of steps 1001-1005 as illustrated in FIG. 10. The signal 220 for selecting the register bank 205-1 of the task 1 from the ID of the task 1 which is an operand is inputted to the register bank controller 210. The register bank controller 210 transmits the signal 225 indicating the task status of the register bank 205-1 of the task 1 which exists in the group of register bank 205. The task status information representing the state of the task in the register bank 205-1 is taken from the data bus 212. The task status modification signal 223 set it a condition representing an executable state from the dormant state. The information is rewritten in the register bank 205-1. Then, the micro ROM 204 generates the ready queue registration signal 221 of the task 1 so that the task 1 is registered as an executable task in the ready queue managing part 209 where the real time OS manages the executable tasks. According to the execution task select signal 224, in the ready queue managing part 209, the highest priority ordered task 1 which is started as task ID to be next executed is selected and the register bank select signal 226 is transmitted to the register bank controller 210. The register bank controller 210 generates the register bank commutation signal 227 in order to shift the control to the register bank 205-1. Thus, the task 1 is executed.

In the second embodiment, each task possesses its characteristic register so that the hardwares which are characteristic of the multitask processing are augmented. However, even in the case of the commutation of the execution task, it is not necessary to save the context of the old execution task and to return the context of the new execution task. Accordingly, the performance at the execution is improved by comparison with the first embodiment. In addition, the processing is realized by a single exclusive instruction in the present embodiment as well as the first embodiment, so that the response characteristic to the interrupt is remarkably improved, in comparison with that of the prior art.

As mentioned above, in the above multitask processing apparatus according to the present invention, it is possible to reduce possibly the processing of the save and return of the context of the task so that the real time OS can execute at a higher speed the functions required for the multitask processing as an system call instruction by the microprogram. Therefore, the overhead of the real time OS is remarkably reduced, which permits to realize the more effective processing of the application by the multitask processing.

Further, each function required for the multitask processing is executed as an exclusive system call instruction. Accordingly, it is not necessary to consider particularly the inhibition of the interrupt generated during the system call processing of the real time OS, which has not been prevented in the case of the conventional processing of the combination of instructions and it is possible to prevent the overflow of the interrupts during the processing of the real time OS. As a result, it is possible to bring a remarkable effect in the improvement of the response characteristic to the interrupt of the system.

Figure 11:
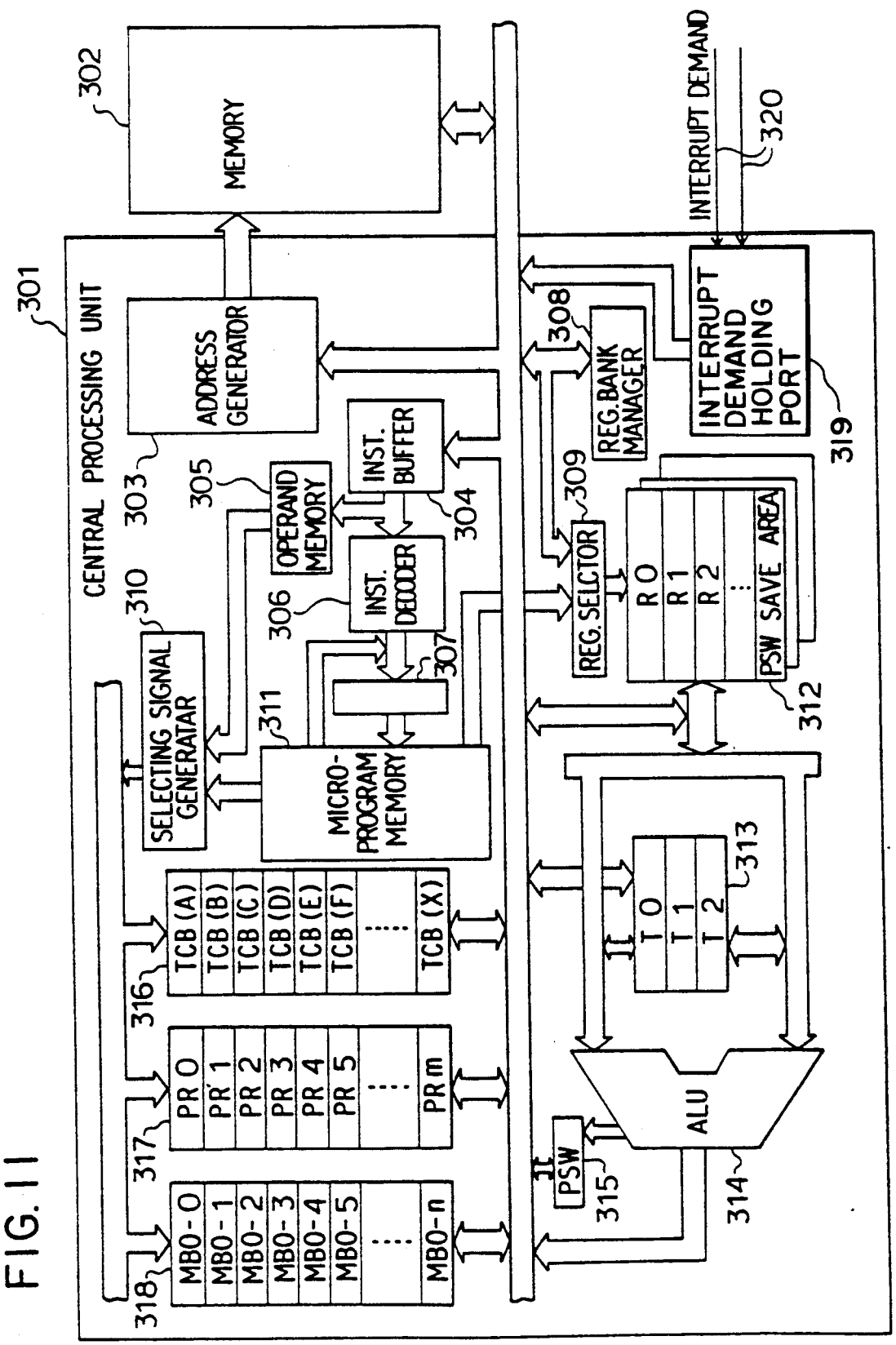
FIG. 11 is a block diagram of a third embodiment of the multitask processing apparatus.

FIG. 11 shows a third embodiment of the multitask processing apparatus which is composed of a computer comprising hardware resources and a microprogram memory required for the multitask processing. Namely, the shown apparatus is constituted of a central processing unit 301 and a memory 302.

An address generator 303 generates an address to the memory at the access to memory and at the fetch of the operation code. An instruction buffer 304 stores temporarily a fetched instruction and an instruction decoder 306 decodes an operation code so that an entry address to a microprogram memory 311 is generated. A microprogram address generator 307 generates an address based on the entry address generated by the instruction decoder 306 or the information generated by the microprogram memory 311 which must be subsequently executed. When the parameter of the system call exists as an operand of an exclusive instruction, an operand 305 stores the operand.

A register bank 312 consisting of plural banks comprises a set of widely used registers CR0, R1, R27 which is necessary to the processing of the program, other address registers and a PSW save area. The plural banks correspond to plural tasks respectively and hold each context at the generation of the exclusive instruction of the system call until they are selected at the dispatching processing of the microprogram. Accordingly, the save of the context to the TCB and the return processing which are required when the processing of each task and that of the OS are executed with the common resources in a single central processing unit are not necessary, and in the case of the commutation of tasks, only the commutation of banks is indispensable in such a constitution of the hardware.

A register bank managing part 308 is operated by the dispatching processing at the part indicating which register bank is the object of the operation of the central processing unit at a certain time. A register selector 309 generates a signal for selecting a register temporarily from selecting signals by the microprogram 311 and bank selecting signals by the register bank managing part 308.

An ALU 314 which is an operation part makes use of a set of temporary registers (T0, T1, T2) 313 in order to execute the operation processing A PSW 315 holds sorts of flags reflecting the result of the operation.

A TCB 316, a ready queue 317 and a mailbox 318 are hardware resources which are particularly necessary to the execution of the multitask processing. The TCB 316 comprises TCBs which correspond to necessary tasks respectively, and each task stores the task status and the priority order of the task etc. The number of the ready queue 317 is the same as that of the priority order (PR) and the ready queue holds identifiers of the executable task. The mailboxes (MBO) 318 exist with the same number of the mailboxes. The constitution of each mailbox 318 manages an identifier of the task which waits for a mailbox, and a pointer to the reception waiting data area. In addition, a select signal generator 310 generates a select signal to a TCB 316, a ready queue 317 and a mailbox 318 based on the information stored in the operand store 305 and the signal from the microprogram 311.

An interrupt demand holding part 319 is a register for storing that the interrupt demand signals 320 are constantly generated when the signals 320 are generated.

The explanation of the processing of the system call exclusive instruction RECEIVE-DATA follows.

Figure 15:
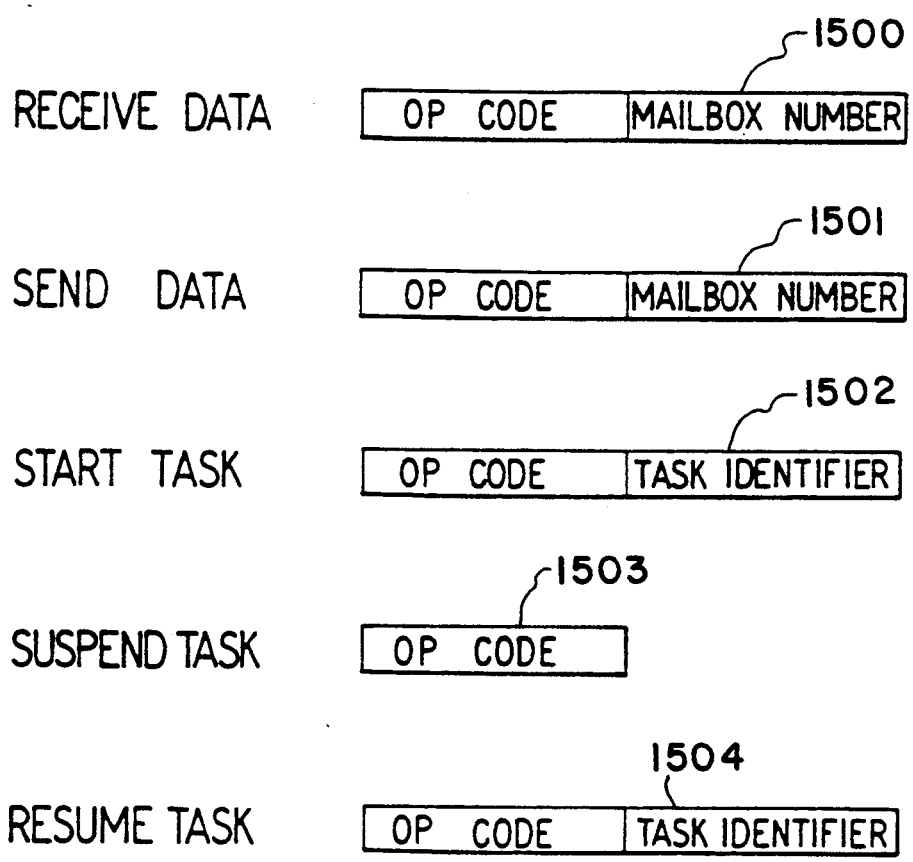
FIG. 15 is a format of the system call exclusive instruction.

The RECEIVE-DATA possesses a mailbox number as an input parameter and a pointer to the reception data as output parameter. FIG. 15 illustrates the 1500-1504 configuration of system call exclusive instructions. The mailbox number which is an input parameter is stored as operand of the exclusive instruction in 1 byte which follows the operation code. In the present example, the mailbox number indicates the mailbox MBO-1. The pointer to the reception data as output parameter is stored in the register RO. The operation code of the exclusive instruction stored in the instruction buffer 304 is decoded by the instruction decoder 306 and generates an entry address to the microprogram memory. On the other hand, the mailbox number as an operand is stored in the operand memory 305.

At the beginning of the microprogram processing, a select signal to MBO-1 is generated from the mailbox number stored in the operand memory 305 and the state of the MBO-1 is judged. In case that the pointer to the reception data is stored, the data has been already transmitted from the task and the generating task receives this pointer. The register bank managing parts 308 assigns the register bank corresponding to the task which generates a system call exclusive instruction then and the register RO of the bank store the pointer of the data. After storage, the dispatching processing is executed. In the dispatching processing, PRO with the higher priority order of the ready queue 307 is judged. When an identifier of a task exists, the task is selected so that the control is shifted to said task. In case that the bank corresponding to the selected task is different from the register bank at the instant, the information of the register bank managing part 308 is renewed and the register bank is commutated and the control is shifted to the task.

When the pointer to the reception data is not stored in the mailbox MBO-1, the generating task waits for the mailbox. The select signal generator 310 generates a select signal to a TCB corresponding to the generating task in the TCB 16 and modifies the task status to the mailbox waiting state. Subsequently, the identifier of the generating task is stored with respect to MBO-1 and the registration of the identifier of the task is eliminated from the management area which corresponds to the priority rank of the generating tasks of the ready queue 317.

At the last microprogram of the dispatching processing, it is judged whether or not there is an interrupt demand in the interrupt demand holding part 319. If the interrupt demand exists, the control is not returned to the task and the interrupt processing microprogram is started.

The ALU 314 and the set of temporary registers 313 is used for the data processing and the temporary data holding if it is necessary during the process.

The resolution as described above permits to realize a system call to the real time OS as exclusive instruction.

Figure 12:
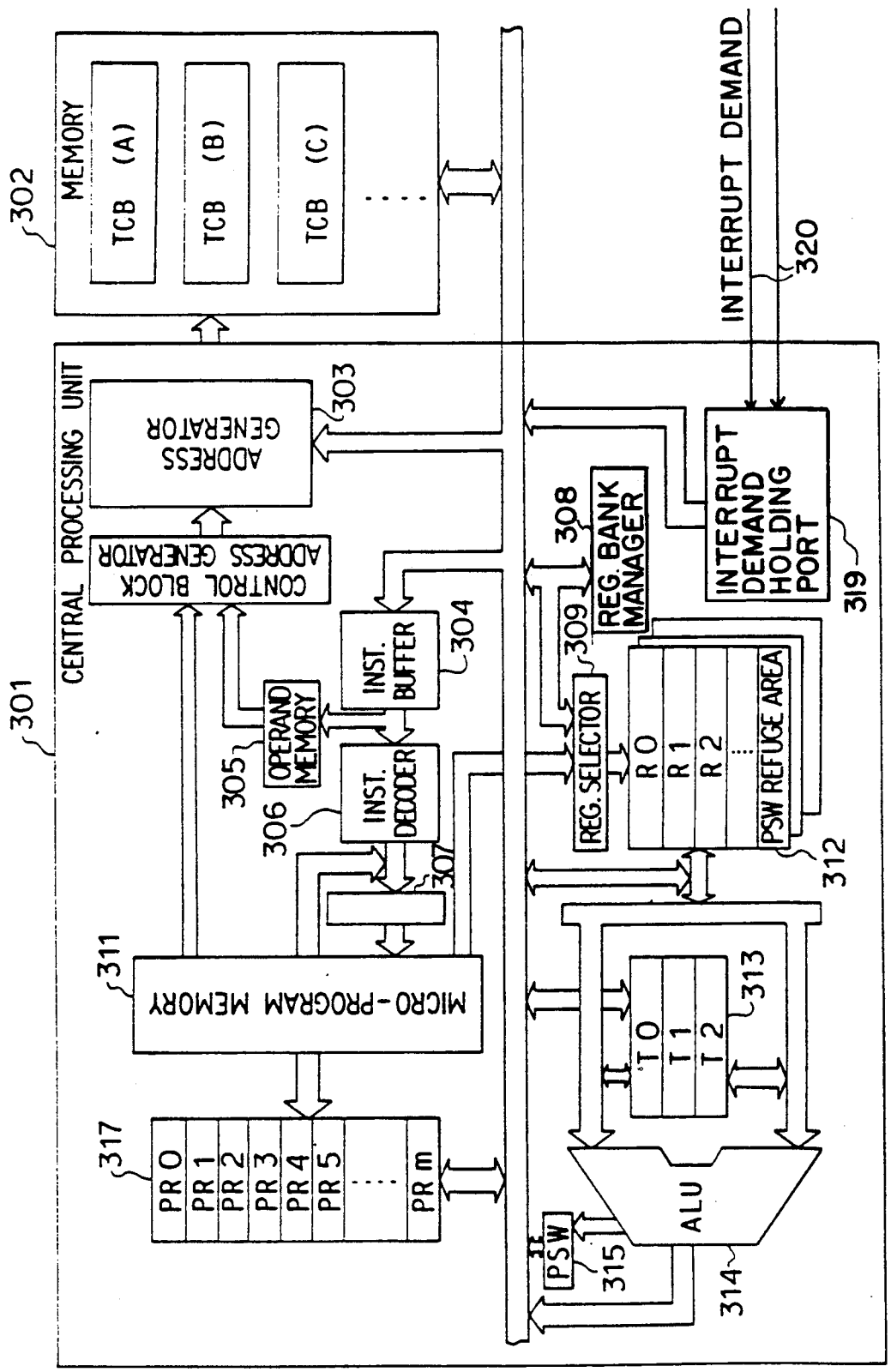
FIG. 12 is a block diagram of a fourth embodiment of the multitask processing apparatus.

FIG. 12 shows an embodiment of the constitution of the multitask processor comprising a central processing unit and a memory 302 which is similar to that of FIG. 11, but in which the data structure such as a TCB and a mailbox is not formed as hardware and developed on the external memory. Here in, the mailbox is not explained.

An address generator 303, an instruction buffer 304, an operand memory 305, an instruction decoder 306, a microprogram address generator 307, a register bank managing part 308, a register selector 309, a microprogram memory 311, a register bank 312, a set of temporary registers 313 an ALU 314, a PSW 315, a ready queue 307, an interrupt demand holding part 319 and an interrupt demand signal 320 possess the same function in the third embodiment, respectively. The TCB is not formed as special hardware constitution and managed as data structure on the external memory.

A control block address generator 316 generates an address to the data structure such as TCB developed on the external memory by the indication from the microprogram 11 and the information of the operand memory 305.

The operation of the system call exclusive instructions START-TASK, SUSPEND-TASK, RESUME-TASK and the flow of the control of the generating task when the hardware constitution is used will be explained.

FIG. 15 illustrates the constitution of the system call exclusive instructions 1500-1504. The START-TASK and the RESUME-TASK store an identifier, respectively, in 1 byte which follows the operation code. The operand is not contained in the constitution of the SUSPEND-TASK.

Figure 13:
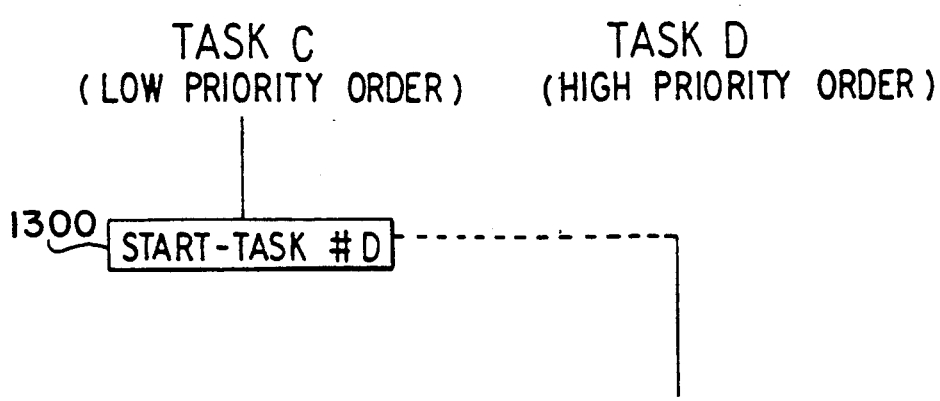
FIG. 13 and FIG. 14 are flowcharts of the processing of each task of the multitask processing.

FIG. 13 shows an example of the multitask processing consisting of two tasks, that is, a high priority ordered task C and a low priority ordered task D. At the initial condition, the task C is executable but the task D is not executable. The task C generates a system call exclusive instruction START-TASK #D 1300 which activates the task D in the process. The exclusive instruction is inputted to the central processing unit 1 and decoded by the instruction decoder 306 through the instruction buffer 304. The head address to the microprogram 311 is generated by the instruction decode and the microprogram is started.

At the first processing of the micro-program, the control block address generator 316 is controlled in order to generate an address to the TCB which corresponds to the task D constituted on the memory D from the identifier of the task #D stored in the operand memory 305. The generated address to the TCB is converted to the address of the practical physical name memory by passing the address generator 303 so as to access the objective TCB on the memory. The task status in the TCB of the task D is not executable at this step, which is however modified to the executable condition. At the next step, the priority order of the task D is read and the identifier is stored in the corresponding priority ordered area of the ready queue 317.

Then, at the dispatching processing, the highest priority ordered task is selected. In this case, the task D is prior to the task C so that the task D is selected. A register bank corresponding to the task D and the register bank managing part 8 are renewed so that the control is shifted to the task D.

FIG. 13 shows that the control is shifted from the task C to the task D by the above mentioned processing.

Figure 14:
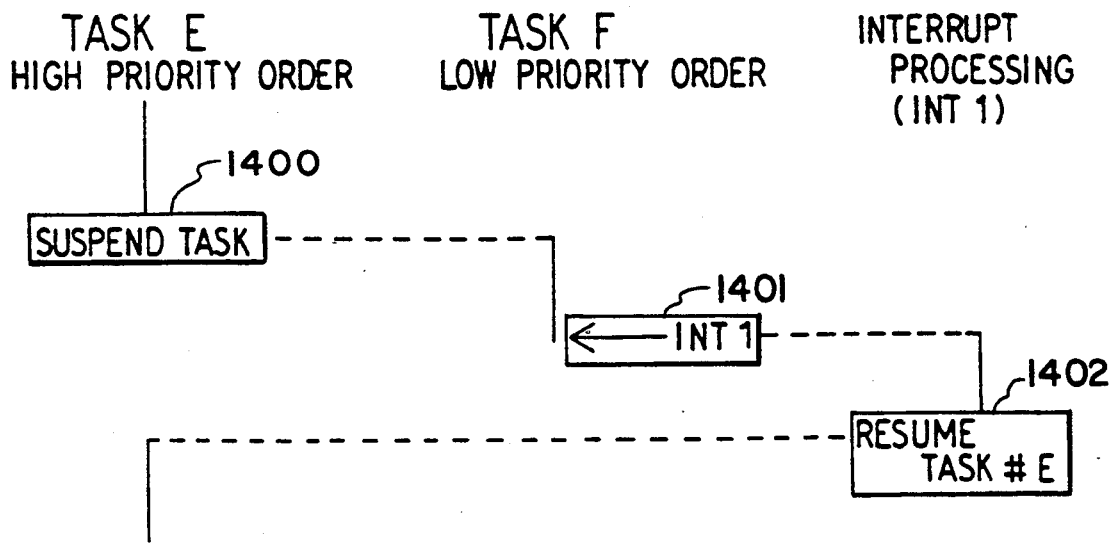

FIG. 14 represents an example of a system call exclusive instruction SUSPEND-TASK 1400 which suspends temporarily the task and an another system call exclusive instruction RESUME-TASK 1400 which dissolves the suspended condition of the task.

The priority order of the task E is prior to that of the task F. At the initial condition, the task E is executable and the task F is not executable. The task E generates a system call exclusive instruction SUSPEND-TASK in order to be temporarily suspended. By the above mentioned process, the microprogram is started.

First, the identifier of the task in action is judged by the register bank managing part. The task status in the TCB corresponding to the task E in the external memory is set from the execution condition to the suspended condition. The identifier of the task is eliminated from the priority ordered area of the ready queue 317 which corresponds to the task E.

At the dispatching processing, the highest priority ordered task is selected, that is, the task F is selected and the control is shifted to the task F.

During the operation of the task F, when an interrupt INT 1 1401 is generated, the control is shifted to the interrupt processing routine correponding to INT 1. In the interrupt processing routine INT 1, assuming that the system call exclusive instruction RESUME-TASK #E 1402 is generated and the suspended condition of the task E is dissolved, in the microprogram processing of the RESUME-TASK, the task status in the TCB corresponding to the task E is sent from the suspended condition to the executable state and the identifier of the task of the task E is registered in the area of the ready queue. Accordingly, the task E is selected and it obtains again the execution right for the execution of the dispatching processing.

As mentioned above, it is possible to realize a system call as an exclusive instruction in the microprogram even by developing the data structure managed by the OS on the external memory. Comparing with the case like the embodiment 1 where all data structure required by the OS is realized as hardware in the central processing unit, the execution speed of the system call exclusive instruction of their embodiment is lower because the external bus cycle must be started, but the hardware resource is reduced.

It is possible to determine the degree of the realization by the hard ware and plan it according to the application of each system.

As mentioned above, in the above mentioned embodiment, it is possible to execute the processing of the system call at high speed not by realizing the system call by the combination of instructions but by treating it as exclusive instruction, by realizing all the processing by the microprogram, and by utilizing hardware resources for the realization of the exclusive instruction. Further, by making use of a particular hardware such as register banks, it is possible to eliminate the save of the context in each task and the return processing so that the overhead to the system call which has been the problems hitherto can be reduced. In the case of the execution of the processing of the system call by the microprogram, assuming that the number of steps is 200, the mean overhead becomes about 40 microseconds with the same frequency because 1 step corresponds to 1 clock in the microprogram, while the mean overhead is 400 microseconds in the case of the realization of the system call by the combinations of instructions as mentioned above. In effect, plural processing to the hardware resources can be simultaneously executed at 1 clock in a microprogram. Accordingly, it is considered to execute it by less number of steps so that the overhead becomes no problem in the major part of application system. Furthermore, the system call is realized as an exclusive instruction by a single instruction so that the considerations such as set of the guard parts against interrupts are not required. Therefore, the considerations about the interrupt response characteristics which has been difficult when planning the real time OS are not necessary. It is effective not only for the OS planning but also for the remarkable improvement of the interrupt response characteristics.

The invention has thus been shown and described with reference to the specific embodiments. However, it should be noted that the invention is in no way limited to the details of the illustrated structures but changes and modifications may be made within the scope of the appended claims.

We claim:

1. A multitask processing apparatus comprising:
   a data bus;
   a main memory coupled to said data bus and including a plurality of task control blocks each storing a status of a corresponding task; and
   a central processing unit including
      an execution unit coupled to said data bus,
      a ready queue managing means, coupled to said data bus, for registering and eliminating a task in an executable state.
      a task control block address generating means for generating an address of a task control block of said main memory,
      an instruction decoder, coupled to said data bus to receive an instruction through said data bus, generating an address of a microprogram corresponding to a received instruction, and
      a microprogram memory, coupled to said instruction decoder to receive said address of said microprogram, generating control signals for said execution unit, for said ready queue managing means and for said task control block address generating means;
   wherein a processing demand to a real time operating system required for execution of multitask processing is given through said data bus as an exclusive instruction including task identification information such that said instruction decoder generates an address of said microprogram corresponding to a received exclusive instruction, and said microprogram memory responds to said address supplied from said instruction decoder and generates control signals for said execution unit, for said ready queue managing means and for said task control block address generating means such that a task status is read out from a task control block designated by said task identification information under the control of said task control block address generating means, and is modified by said execution unit and then rewritten to the same task control block, and a task designated by said task identification information is registered as an executable task in said ready queue managing means, and thereafter, a task to be executed next is selected from said ready queue managing means, and
   wherein said real time operating system is implemented by hardware resources and microprograms stored in said microprogram memory without using a program composed of a combination of instructions to perform a system call.

2. An apparatus as claimed in claim 1, wherein when a first task being executed sends a processing demand to said real time operating system required for starting a second task, an exclusive instruction including an operating code for starting said second task and a task identification number corresponding to said second task is received and processed such that said instruction decoder generates an address of a microprogram corresponding to said received exclusive instruction, and said microprogram memory responds to an address supplied from said instruction decoder to control said task control block address generating means to cause said task control block address generating means to supply said main memory with an address of a task control block corresponding to said second task such that a task status is read out from said task control block corresponding to said second task through said data bus to said execution unit, said microprogram memory also operating to control said execution unit to modify said task status to an executable status and rewrite a modified task status to said task control block corresponding to said second task, said microprogram memory also operating to control said ready queue managing means to register said second task as an executable state, and to output an execution task selection signal to said ready queue managing means such that a task to be executed next is selected from said ready queue managing means.

3. An apparatus as claimed in claim 1, wherein when a first task being executed sends a processing demand to said real time operating system required for suspension of said first task, an exclusive instruction including an operation code for suspending said first task and a task identification number corresponding to said first task is received and processed such that said instruction decoder generates an address of said microprogram corresponding to said received exclusive instruction, and said microprogram memory responds to an address supplied from said instruction decoder to control said task control block address generating means to cause said task control block address generating means to supply said main memory with an address of a task control block corresponding to said first task such that a task status is read out from said task control block corresponding to said first task through said data bus to said execution unit, said microprogram memory also operating to control said execution unit to modify said task status to a wait status and to rewrite a modified task status to said task control block corresponding to said first task, said microprogram memory also operating to control said ready queue managing means to eliminate said first task as an executable state, and to output an execution task selection signal to said ready queue managing means such that a task to be executed next is selected from said ready queue managing means.

4. A multitask processing apparatus comprising:
a data bus;
a main memory coupled to said data bus and storing an application program; and
a central processing unit including
an execution unit coupled to said data bus,
a ready queue managing means, coupled to said data bus, for registering and eliminating a task in an executable state,
a group of register banks, coupled to said data bus, each corresponding to one task and having an area storing a status of a corresponding task,
a register bank controller, coupled to said data bus, controlling said register banks,
an instruction decoder, coupled to said data bus to receive an instruction through said data bus, generating an address of a microprogram corresponding to a received instruction, and
a microprogram memory, coupled to said instruction decoder to receive said address of said microprogram, generating control signals for said execution unit, for said ready queue managing means and for said register bank controller;
wherein a processing demand to a real time operating system required for execution of multitask processing is given through said data bus as an exclusive instruction including task identification information such that said instruction decoder generates an address of said microprogram corresponding to a received exclusive instruction, and said microprogram memory responds to an address supplied from said instruction decoder to generate control signals for said execution unit, for said ready queue managing means and for said register bank controller such that a task status is read out from a register bank designated by said task identification information under the control of said register bank controller, and is modified by said execution unit and then rewritten to the same register bank, and a task designated by said task identification information is registered as an executable task in said ready queue managing means, and thereafter, a task to be executed next is selected from said ready queue managing means, and
wherein said real time operating system is implemented by hardware resources and microprograms stored in said microprogram memory without using a program composed of a combination of instructions to perform a system call.

5. An apparatus as claimed in claim 4, wherein when a first task being executed sends a processing demand to said real time operating system required for starting a second task, an exclusive instruction including an operation code for starting said second task and a task identification number corresponding to said second task is received and processed such that said instruction decoder generates an address of said microprogram corresponding to a received exclusive instruction, and said microprogram memory responds to an address supplied from said instruction decoder to control said register bank controller to cause a task status to be read out from a register bank corresponding to said second task through said data bus to said execution unit, said microprogram memory also operating to control said execution unit to modify said task status to an executable status and to rewrite a modified task status to said register bank corresponding to said second task, said microprogram memory also operating to control said ready queue managing means to register said second task as an executable state, and to output an execution task selection signal to said ready queue managing means such that a task to be executed next is selected from said ready queue managing means.

6. A multitask processing apparatus comprising:
a bus;
a main memory coupled to said bus and storing an application program; and
a central processing unit including
an address generator, coupled to said bus to receive an instruction through said bus, generating an address on the basis of a received instruction and supplying a generated address to said main memory, an execution unit coupled to said bus, an instruction decoding means, coupled to said bus to receive an instruction through said bus, for generating an address of a microprogram corresponding to a received instruction.

a microprogram memory, coupled to said instruction decoding means to receive an address of said microprogram, generating control signals, a plurality of task control blocks, coupled to said bus, each holding a status of a corresponding task, a plurality of mailboxes, coupled to said bus, each temporally storing data, a ready queue, coupled to said bus and including a plurality of registers, holding an order of priority of tasks, an operand memory coupled to receive an operand included in an instruction supplied through said bus, selecting means, coupled to said operand memory to receive a control signal from said microprogram memory, for selecting one of said task control blocks and one of said mailboxes, a register bank including a plurality of banks each corresponding to one task and holding a context at a time of generation of an exclusive instruction for a system call, and register bank selecting means for selecting one bank of said plurality of banks;

wherein a processing demand to a real time operating system required for execution of multitask processing is given through said bus as an exclusive instruction including task identification information without using a program composed of a combination of instructions to perform said system call such that said instruction decoding means generates an address of said microprogram corresponding to a received exclusive instruction, and said microprogram memory responds to said address supplied from said instruction decoding means to generate control signals for said selecting means and for said register bank selecting means, such that one mailbox is selected by said selecting means on the basis of a content of said operand memory regardless of whether data stored in a selected mailbox has been examined and a bank corresponding to a task which has generated said system call is selected from said register bank, and thereafter, said ready queue is examined such that a highest priority task is selected and a task having said highest priority is selected as a task to be executed next.

7. A multitask processing apparatus comprising:

a bus;

a main memory coupled to said bus and having a plurality of task control blocks each holding a status of a corresponding task and a plurality of mailboxes each temporally storing data; and a central processing unit including an address generator, coupled to said bus to receive an instruction through said bus, generating an address on the basis of a received instruction and supplying a generated address to said main memory, an execution unit coupled to said bus, an instruction decoding means, coupled to said bus to receive an instruction through said bus, for generating an address of a microprogram corresponding to a received instruction, a microprogram memory, coupled to said instruction decoding means to receive said address of said microprogram, generating control signals, a ready queue, coupled to said bus and including a plurality of registers holding an order of priority of tasks, an operand memory coupled to receive an operand included in an instruction supplied through said bus, control block address generating means, coupled to said operand memory and receiving a control signal from said microprogram memory, for controlling said address generator to select one of said task control blocks and one of said mailboxes in said main memory, a register bank including a plurality of banks each corresponding to one task and holding a context at a time of generation of an exclusive instruction for a system call, and register bank selecting means for selecting one bank of said plurality of banks;

wherein a processing demand to a real time operating system required for execution of multitask processing is given through said bus as an exclusive instruction including task identification information without using a program composed of a combination of instructions to perform said system call such that said instruction decoding means generates an address of said microprogram corresponding to a received exclusive instruction, and said microprogram memory responds to said address supplied from said instruction decoding means to generate signals for said control block address generating means and for said register bank selecting means such that one mailbox is selected by said control block address generating means on the basis of a content of said operand memory regardless of whether data stored in a selected mailbox has been examined, and such that a bank corresponding to a task which has generated said system call is selected from said register bank, and thereafter, said ready queue is examined such that a highest priority task is selected and a task having said highest priority is selected as a task to be executed next.

* * * * *